United States Patent Office 2,814,250
Patented Nov. 26, 1957

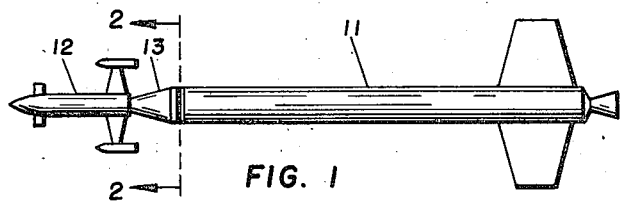
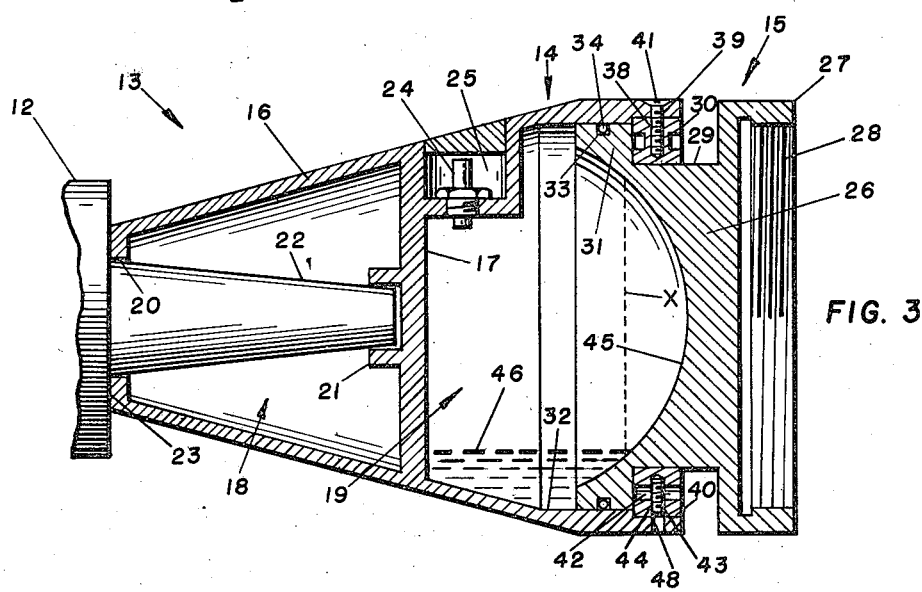
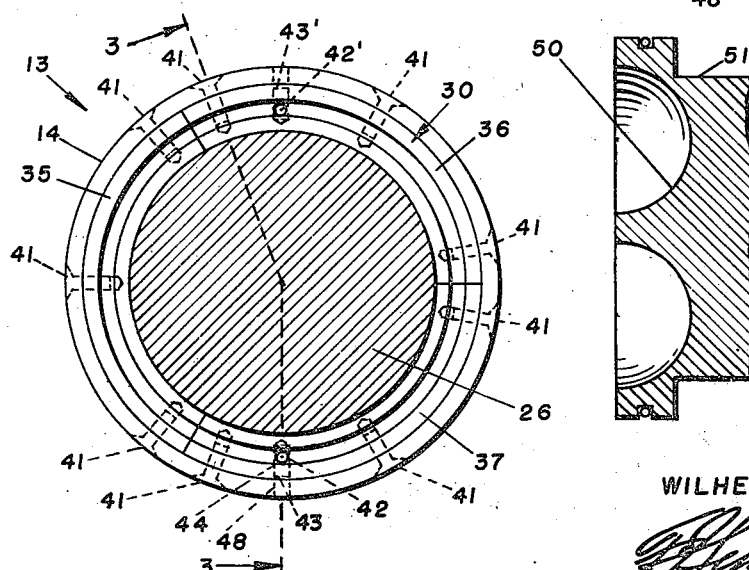

2,814,250

ADJUSTABLE SHOCK AND VIBRATION MOUNT

Wilhelm S. Everett, Santa Paula, Calif.

Application July 3, 1952, Serial No. 297,190

14 Claims. (Cl. 102—49)

(Granted under Title 35, U. S. Code (1952), sec. 266)

The invention described herein may be manufactured and used by or for the Government of the United States of America for governmental purposes without the payment of any royalties thereon or therefor.

This invention relates to an adjustable shock and vibration mount particularly adapted to be mounted between a booster motor and a missile in launching it.

Due to the irregular burning of the fuel in the booster motor, destructive vibrations are set up. Heretofore, these vibrations have been transmitted to the missile resulting in damage to the internal mechanism of the missile and often ultimate failure thereof. Conventional hydraulic shock mounts are not suitable for use with a booster motor of the type employed for missile launching, as they will not attenuate vibrations of the frequency encountered with such booster motors and would therefore transmit vibrations of the booster motor to the missile.

One object of the present invention is to provide an improved shock and vibration mount adapted to be interposed between a booster motor and a missile to absorb the initial shock due to acceleration of the missile by the booster motor during launching.

Another object is to provide a shock and vibration mount of the type indicated whereby substantially none of the vibrations of the booster motor due to irregular burning of its fuel will be transmitted to the missile.

A particular aim of the invention is to afford a shock mount of the type noted above which is designed to damp out lateral vibrations and to isolate longitudinal vibrations to thus prevent transmission thereof to the missile.

A further object of the invention is the provision of an improved shock and vibration mount which is simple in construction and easy to maintain, yet dependable and positive in operation.

Other objects and many of the attendant advantages of this invention will be readily appreciated as the same becomes better understood by reference to the following detailed description when considered in connection with the accompanying drawings wherein:

Fig. 1 shows the invention device mounted in position between a booster motor and a missile, Fig. 2 is an enlarged cross-sectional view of one embodiment of the invention taken along the line 2—2 of Fig. 1, looking in the direction of the arrows, Fig. 3 is a sectional view taken along line 3—3 of Fig. 2, and Fig. 4 illustrates a modification of the device shown in Fig. 3.

The invention device is an adjustable shock and vibration mount which may be so adjusted as to prevent the transmission of the axial vibrations or vibrations along the thrust line of the booster motor to the missile by adjusting the natural or resonant frequency of the shock mount according to the frequency of vibration of the booster motor. The frequency of vibration of the booster motor in an axial direction may be determined by test and then by properly adjusting the shock mount so that the frequency of the booster motor is approximately five times the resonant frequency of the mount, such vibrations of the booster motor are effectively "isolated" therein and are not transmitted to the missile through the shock mount. Damping means is provided to prevent the transmission of lateral vibrations of the booster motor to the missile.

Referring now to the drawings wherein like reference characters designate like or corresponding parts throughout the several views, there is shown in Fig. 1 a booster motor 11 which provides the initial starting thrust, and a missile 12. Interposed between the booster motor and the missile is the improved shock and vibration mount 13 of the present invention.

Details of one embodiment of the invention may be best seen by referring to Fig. 3 of the drawings. As shown in Fig. 3, the improved shock and vibration mount comprises a cylinder 14 and a closely fitting piston 15 adapted to reciprocate therein. The cylinder 14 has a hollow body portion 16 of varying circular cross section which is separated by a lateral partition 17 into a forward chamber 18 and a rear chamber 19, the former of which is adapted to receive a portion of the missile and the latter of which is adapted to receive the piston 15. The chamber 18 has a circular opening 20 at the forward end thereof and a cup-like portion 21 at its rearward end, and is thereby adapted to receive a suitable extension 22 at the rear of the missile 12 which is inserted by a push fit into the chamber 18 of the mount. The shoulder 23 transmits the thrust of the booster motor to the missile through the intermediary of the mount. It may be readily seen that as long as the booster motor is accelerating faster than the missile the thrust of the booster motor will be transmitted to the missile through the shoulder 23. However, as soon as the missile begins to accelerate faster than the booster motor, the missile with its extension 22 will pull away from the booster motor and mount and proceed under its own power.

A valve 24 is suitably mounted in a recess 25 in the body portion 16, the valve being accessible from the exterior of the body portion and communicating with the interior of chamber 19. The valve 24 may be of conventional bicycle-tire type, suitable for introducing and venting both a compressible and a non-compressible fluid into and from chamber 19. Reference numeral 46 indicates a body of incompressible fluid which has been introduced into chamber 19.

The piston 15 comprises a body portion 26 having a rearwardly extending flange 27 provided with screw threads 28 on its inner periphery adapted to cooperate with corresponding screw threads on the booster motor for securing the piston 15 thereto.

The forward portion of the piston 15 contains a recessed cavity 45 having the configuration of a spherical segment as shown in Fig. 3, which is the preferred shape of the cavity. The cavity 45 is disposed symmetrically about the longitudinal axis of the piston 15. Such cavity may have other geometrical shapes, as long as its cross-sectional configuration is that of a continuous curve and the cavity is disposed symmetrically about the longitudinal axis of the piston. Cavity 45 is adapted to receive the incompressible fluid in the chamber 19 when the shock mount is subjected to acceleration by the booster motor. The cavity is made sufficiently large to receive the maximum amount of fluid which may be required in chamber 19 to adjust for any flight condition.

Due to the irregular burning of the fuel in the booster motor, vibrations may develop in a direction lateral to the direction of flight of the missile, and it therefore becomes necessary to provide a means to damp out such lateral vibrations. The incompressible fluid 46 which is carried in cavity 45 during the launching operation serves to damp out lateral vibrations since, as the mount tends to vibrate laterally, the center of gravity of the body of incompressible fluid in the cavity 45 will shift relative to the cavity due to the inertia of this body of fluid, and will resist such vibrations. Lateral vibrations will therefore be damped out by oscillations of the incompressible fluid 46 in cavity 45. The design of the cavity and the fluid therein thus function as a vibration damper for all lateral vibrations of the booster motor, as the fluid 46 is free to move in any lateral direction within the cavity 45 during acceleration of the booster motor and missile. This is an important feature of the invention.

The body portion 26 of piston 15 has an annular groove 29 in its outer periphery which contains a ring 30. The body portion 26 also has a forwardly extending portion 31 adapted to fit tightly within the inner periphery 32 of the body portion 16 of cylinder 14, such forwardly extending portion having an annular groove 33 in its outer periphery which contains a conventional O-ring seal 34 bearing against the inner periphery 32. Thus, the piston 15 has an air-tight fit with the interior of cylinder 14.

The ring 30, as shown in Fig. 2, is a split ring and is formed preferably in three sections 35, 36, 37 to facilitate assembly of the ring in place. The three sections 35, 36, 37 are first assembled about the piston 15, resting in the annular groove 29, the inner portions of the ring having a tight fit with the bottom of groove 29 when in assembled position. The piston with the ring 30 in position in the groove 29 is then inserted into cylinder 14 until the screw threaded openings 38 in the ring 30 are aligned with corresponding openings 39 in cylinder 14. The three portions 35, 36, 37 of ring 30 are then drawn up tightly to the internal periphery 40 of cylinder 14 by means of screws 41.

The ring 30 also contains openings extending therethrough in an axial direction and these are shown as two in number, 42, 42', located at diametrically opposed positions in the ring. These openings 42, 42' may be selectively restricted by means of screw threaded set screws 43, 43' which cooperate with corresponding screw threaded openings 44 in the ring 30. Openings 48 in body portion 16 provide access to the openings 44 when the ring is in assembled position. The openings 44 communicate with the openings 42 in a normal direction thereto such that when set screws 43, 43' are threaded into openings 44 they will be forced into and restrict openings 42, 42'. The diameters of the set screws are substantially the same as the diameters of the openings 42, 42'.

It will be seen that the ring 30 will serve to limit the rearward travel of the piston 15 and prevent the piston from being forced from the cylinder 14 when a precharge of compressed gas is placed in chamber 19.

The ring 30 will also serve to damp out axial oscillations between the piston 15 and the cylinder 14, due to axial vibrations of the booster motor. The damping effect is due to the fact that when the piston 15 moves forward in the cylinder 14 an annular chamber will be created between the forwardly extending portion 31 of the piston and the ring 30, the openings 42 providing the only means for air to enter and exhaust from this chamber. The restriction of air entering and leaving this chamber will provide a certain amount of resistance to relative movement between the cylinder 14 and the piston 15, the resistance being adjustable by varying the distance that the set screws 43, 43' extend into the openings 42, 42'. This resistance to relative movement between the cylinder 14 and the piston 15 will serve to damp out axial oscillations between these two members in a well known manner. The ring 30 is incorporated primarily as a safety device, since it will do little damping at the normal frequency of axial vibrations of the booster motor as the axial oscillations between the piston and cylinder will be quite small at such frequencies. However, the ring 30 will have a substantially greater effect should the booster motor develop a disturbing axial vibration, the frequency of which is near that of the resonant frequency of the shock mount, since the axial oscillations between the piston and cylinder will then tend to be quite large.

As pointed out previously, the valve 24 is suitable for introducing both a compressible and a non-compressible fluid into chamber 19. The incompressible fluid may be any suitable hydraulic fluid such as glycerine, silicone fluid, hydraulic oil, or the like, and the compressible fluid may be any suitable gas such as air, nitrogen, methane, or the like. However, the two fluids must be compatible, or in other words, they must be of such a nature that the incompressible fluid will not absorb the compressible fluid, or react with it.

The compressible fluid will serve to absorb the initial shock due to acceleration of the booster motor. This shock will be absorbed by the compressing and heating of the compressible gas in chamber 19. The maximum average thrust that the booster motor will develop may be calculated and the volume and cross-sectional area of the chamber 19 are known. Therefore, for a gas of a known poly-tropic coefficient of expansion, one may calculate the final pressure of the compressible fluid in chamber 19 necessary to absorb the maximum thrust from the booster motor. This final pressure will be the pressure of the compressible gas in chamber 19 after the piston 15 has travelled a desired distance forward within the cylinder 14. Since the piston compresses the compressible gas as it moves forward in chamber 19, the initial pressure required in chamber 19 when the piston 15 is at its rearward limit of travel is necessarily less than the final pressure. This required initial pressure in chamber 19 may be calculated and may be referred to as the precharge pressure.

The frequency of vibration of the booster motor in an axial direction due to irregular burning may be calculated. After the precharge pressure for chamber 19 has been determined the resonant frequency of the shock mount may be adjusted to the desired frequency by the addition of a calculated amount of incompressible fluid through valve 24. The addition of such fluid will change the volume of the chamber 19 and since the volume of the chamber is one of the variables which determine the resonant frequency of the mount, the resonant frequency will be altered. It is therefore evident that the incompressible fluid serves a two-fold purpose in the present invention, i. e., it functions to adjust the resonant frequency of the mount and also to aid in damping out the lateral vibrations of the booster motor. The resonant frequency of the shock mount is always adjusted to approximately one-fifth the frequency of the axial vibrations of the booster motor. When such a condition exists, the mount effectively "isolates" the axial vibrations of the booster motor and such vibrations will not be transmitted through the mount to the missile.

Fig. 4 illustrates a modified piston which may be incorporated in the device as shown in Fig. 3 of the drawing. In this modification, the cavity 50 in the face of the piston 51 has the configuration of a toroidal segment. The modified piston will function just as the piston shown in Fig. 3 in damping out the lateral vibrations of the booster motor.

It is evident that the mount may be so designed that the piston thereof can be operatively connected to the missile and the cylinder thereof operatively connected to the booster motor, if desired.

The assembly and operation of the device as shown in Fig. 3 is as follows:

The necessary amount of incompressible fluid and the precharge pressure are first calculated according to the characteristics of the booster motor, i. e., its frequency of axial vibration and the maximum thrust thereof. The calculated amount of incompressible fluid is first introduced into chamber 19 through valve 24. A suitable compressible fluid such as air is then introduced into chamber 19 through the valve 24 at the calculated precharge pressure. The piston 15 is then secured to the booster motor by means of screw-threads 28 and the extension 22 of missile 12 is inserted through the opening 20 in the shock mount and is fitted into cup-like portion 21 thereof.

The mount is then in assembled position and the missile is ready to be fired.

Upon initial acceleration of the booster motor, the piston 15 will travel forward in the cylinder 14 compressing the compressible fluid in chamber 19 until sufficient pressure has been built up within the chamber 19 to balance the thrust of the booster motor. This action will serve to absorb the initial impact due to acceleration of the booster motor. As piston 15 moves forward in cylinder 14, the fluid 46 which has been resting at the bottom of chamber 19 as shown in Fig. 3 will be forced into the recess 45 due to the force of acceleration. The fluid will remain in the cavity as long as the booster motor continues to accelerate, partially filling the cavity as shown by the dotted line X in Fig. 3. The fluid is then in position to damp out any lateral vibrations of the booster motor as pointed out previously. Since the resonant frequency of the shock mount has been adjusted so that its frequency is approximately one-fifth the frequency of axial vibrations of the booster motor due to irregular burning of the fuel therein, the axial vibrations of the booster motor will not be transmitted to the missile. If a disturbing axial vibration should develop in the booster motor, the frequency of which is near the resonant frequency of the shock mount, the ring 30 containing the variable openings 42, 42' will serve to damp out any relative oscillations between the cylinder 14 and the piston 15. As soon as the missile starts accelerating faster than the booster motor, the missile will pull away from the mount and booster motor assembly, and travel forward under its own power.

From the foregoing it may be seen that in accordance with the invention, an improved shock and vibration mount is provided whereby the mount may be adjusted so as to absorb the initial shock of acceleration of a booster motor and also to prevent vibrations of the booster motor, due to irregular burning of its fuel, from being transmitted to the missile. It is apparent also, that the invention device is simple in construction and may be easily maintained, yet is dependable and positive in its operation.

Obviously many modifications and variations of the present invention are possible in the light of the above teachings. It is therefore to be understood that within the scope of the appended claims the invention may be practiced otherwise than as specifically described.

I claim:

1. In combination with a missile and booster motor for launching said missile, an adjustable shock and vibration mount positioned therebetween, said mount comprising a cylinder, a piston closely fitting therein, means supported by said cylinder for adjusting the resonant frequency of said mount in relation to the frequency of axial vibration disposed between said cylinder and piston for said motor, means for absorbing the impact of said booster motor on said piston due to acceleration of said motor and means including a portion of said piston for damping out lateral vibrations of said booster motor.

2. The combination as set forth in claim 1, said mount including means mounted between said cylinder and piston for damping out axial oscillations between said piston and said cylinder.

3. An adjustable shock and vibration mount adapted to be mounted between a booster motor and a missile, which comprises a piston, a cylinder, a chamber enclosed by said piston and cylinder, valve means for introducing and venting fluids into and from said chamber, and means including a recessed cavity in the portion of said piston within said chamber for damping out lateral vibrations of said booster motor, said cavity having a cross sectional configuration in the form of a continuous curve and being adapted to receive an incompressible fluid from said chamber.

4. An adjustable shock absorbing and vibration isolating and damping device adapted to be mounted between a booster motor and a missile, which comprises a piston, a cylinder, an enclosed chamber formed by said piston and cylinder, valve means for pre-charging and venting fluids into and from said chamber, an incompressible fluid in said chamber and a recessed cavity in the portion of said piston within said chamber, said cavity having a cross-sectional configuration in the form of a continuous curve and being symmetrical with respect to the longitudinal axis of said piston and adapted to receive said incompressible fluid for oscillation therein to damp out any lateral vibrations during acceleration of said booster motor.

5. The device defined in claim 4 wherein said cavity has the configuration of a spherical segment.

6. An adjustable shock and vibration mount adapted to operatively connect a booster motor and a missile, which comprises a piston, a cylinder, a chamber enclosed by said piston and cylinder, means for introducing and venting fluids into and from said chamber, an incompressible fluid in said chamber, a compressible fluid in said chamber, said piston having formed in its forward end a recessed cavity having the configuration of a spherical segment, said cavity being adapted to receive all of said incompressible fluid upon acceleration of said piston, said incompressible fluid being free to move in any lateral direction within said cavity whereby lateral vibrations of said piston are damped out.

7. A device as defined in claim 6 including means to damp out axial oscillations between said piston and said cylinder.

8. An adjustable shock and vibration mount adapted to operatively connect a booster motor and a missile, which comprises a piston, a cylinder, a chamber enclosed by said piston and cylinder, means for introducing and venting fluids into and from said chamber, an incompressible fluid in said chamber, a compressible fluid in said chamber, said piston having formed in its forward end a recessed cavity having the configuration of a spherical segment, said cavity being adapted to receive all of said incompressible fluid upon acceleration of said piston, said incompressible fluid being free to move in any lateral direction within said cavity whereby lateral vibrations of said piston are damped out, and means to damp out axial oscillations between said piston and said cylinder including an annular groove in said piston, a ring secured to said cylinder and positioned within said groove, said ring having at least one opening therein and means for selectively restricting said opening.

9. A device as defined in claim 4 wherein said cavity has the configuration of a toroidal segment.

10. A device as defined in claim 4 including means to damp out axial oscillations between said piston and said cylinder.

11. In combination with a booster motor and a missile, a shock and vibration mount which comprises a piston operatively connected to said booster motor, a cylinder operatively connected to said missile, a chamber enclosed by said piston and cylinder, means for introducing and venting fluids into and from said chamber, an incompressible fluid in said chamber, a compressible fluid in said chamber, said piston having formed in its forward end a recessed cavity having the configuration of a spherical segment, said cavity being adapted to receive all of said incompressible fluid upon acceleration of said piston, said incompressible fluid being free to move in any lateral direction within said cavity whereby lateral vibrations of said piston are damped out, and means to damp out axial oscillations between said piston and said cylinder.

12. An adjustable shock and vibration mount adapted to be mounted between a booster motor and a missile, which comprises a piston, a cylinder, a chamber enclosed by said piston and cylinder, valve means for introducing and venting fluids into and from said chamber, an incompressible fluid in said chamber and a recessed cavity in the portion of said piston within said chamber, said cavity having a cross-sectional configuration in the form of a continuous curve and being adapted to receive said incompressible fluid from said chamber.

13. In combination with a missile and booster motor for launching said missile, an adjustable shock and vibration mount positioned therebetween, said mount comprising a cylinder having a piston closely fitting therein, means disposed between said cylinder and piston for absorbing the impact of said booster motor on said piston due to acceleration of said motor, and fluid means supported by said cylinder, and means for admitting said fluid means into the cylinder for adjusting the resonant frequency of said mount in relation to the frequency of axial vibration of said motor.

14. In combination with a missile and booster motor for launching said missile, an adjustable shock and vibration mount positioned therebetween, said mount comprising a cylinder having a piston closely fitting therein, means disposed between said cylinder and piston for absorbing the impact of said booster motor on said piston due to acceleration of said motor, and means including a portion of said piston for damping out lateral vibrations of said booster motor.

References Cited in the file of this patent
UNITED STATES PATENTS

| | | |
|---|---|---|
| 412,670 | Ross | Oct. 8, 1889 |
| 483,126 | Bates | Sept. 27, 1892 |
| 2,397,658 | Goddard | Apr. 2, 1946 |